United States Patent

Naaktgeboren et al.

Patent Number: 5,467,702
Date of Patent: Nov. 21, 1995

[54] BALER STUFFER MECHANISM AND METHOD

[75] Inventors: Adrianus Naaktgeboren, Varsenare; Christiaan A. C. Lippens, Sint-Laureins, both of Belgium

[73] Assignee: New Holland North America, Inc., New Holland, Pa.

[21] Appl. No.: 260,296

[22] Filed: Jun. 14, 1994

[30] Foreign Application Priority Data

Jul. 24, 1993 [EP] European Pat. Off. .......... 93202182

[51] Int. Cl.⁶ .................. B30B 13/00; B30B 7/00
[52] U.S. Cl. .................. 100/35; 56/341; 56/DIG. 1; 100/142; 100/189
[58] Field of Search .................. 100/35, 142, 189, 100/215; 56/341, DIG. 1

[56] References Cited

U.S. PATENT DOCUMENTS

| | | | |
|---|---|---|---|
| 2,929,191 | 3/1960 | Lohnert | 100/189 |
| 4,034,543 | 7/1977 | Voth et al. | 100/142 |
| 4,106,267 | 8/1978 | White | 56/1 |
| 4,118,918 | 10/1978 | White | 100/189 |
| 4,569,282 | 2/1986 | Galant | 100/189 |
| 4,656,938 | 4/1987 | Webb et al. | 100/189 |
| 4,825,760 | 5/1989 | Weddeling | 100/189 |
| 4,862,797 | 9/1989 | Mathis | 100/189 |

FOREIGN PATENT DOCUMENTS

| | | | |
|---|---|---|---|
| 517004 | 11/1954 | Belgium | 100/189 |
| 0120780 | 10/1984 | European Pat. Off. | |
| 1293647 | 4/1962 | France | 100/142 |
| 951247 | 10/1956 | Germany | 100/189 |
| 1215640 | 3/1986 | U.S.S.R. | 100/189 |
| 897410 | 5/1962 | United Kingdom | 100/189 |
| 2197251 | 5/1988 | United Kingdom | |

*Primary Examiner*—Stephen F. Gerrity
*Attorney, Agent, or Firm*—Frank A. Seemar; Larry W. Miller

[57] ABSTRACT

An agricultural baler (1) having a duct (26) for the transportation of crop material to a bale case (10), wherein it is compressed into bales. Above the duct (26) is provided a loading device comprising a pair of cyclically rotating cranks (74), pivotably connected to a pair of levers (72) of a stuffing fork assembly (66). During operation the levers (72) are moved along journals (88) which fit in oblong slots (90) of said levers (72). The journals (88) are installed on pivotable members (94) which are forced upwardly in a first position against stop members (98, 100) by springs (99). Upon rotation of the cranks (74) the tines (70) of the fork follow a generally kidney-shaped path (92). When the tines enter the duct (26), the pivot members (94) are forced downwardly to a second position by the abutment of the journals (88) against plugs (106) in the slots (90), whereafter they are force upwardly by the cam member (102) of the cranks (74). The proper dimensioning and location of plugs (106) and pivot members (94) allows a substantial reduction of the peak speed of the tines (70) during the stuffing of the bale case (10). The forces applied by the crop material to the stuffer mechanism are reduced accordingly.

18 Claims, 6 Drawing Sheets

BALER STUFFER MECHANISM AND METHOD

FIELD OF INVENTION

The present invention relates to agricultural balers for the formation of bales of crop material, such as hay, straw or silage in a bale chamber, and more particularly to the loading means for the transportation of said material from within a duct to the bale chamber.

BACKGROUND OF INVENTION

Terms such as "forward", "rearward", "left", "right", etc when used in connection with the baler and/or components thereof are determined with reference to, and facing in, the direction of operative travel of the baler in the field.

In a conventional baler, as exemplified in U.S. Pat. No. 4,106,267, issued Aug. 15, 1978 in the name of Allen A. White, hay, straw, or similar crop material that has been previously cut, is picked up from the ground by a pickup unit, fed into a duct by a packer unit and loaded in successive batches or charges into an elongated bale chamber by tines of a stuffer unit in timed sequence with a reciprocating plunger. The plunger compresses the material into bales and, at the same time, gradually advances the bales towards the outlet of the bale chamber. As the bales reach a predetermined length, a knotter device is actuated which wraps twine or other flexible binding material around the bale and secures the ends thereof together.

The packer unit precompresses the crop material in the duct against a backstop formed by the plunger. The stuffer unit is designed to load charges of said crop material into the bale chamber within the interval during which the reciprocating plunger clears the entrance of the bale chamber. Typically this is accomplished by a fork assembly comprising arms rotatably connected to cranks, the arms being provided with longitudinally extending slots in which stationary journals are received. A uniform revolution of the cranks makes the arms shift along and pivot about the journals so that the tines of the fork travel in a generally kidney-shaped path with a varying speed. The maximum speed is attained when the distance between the connection to the cranks and the stationary journals reaches its minimum, since the arms then act as levers with very close fulcrum points. Such system permits a quick sweep of the material behind the packer unit through the duct and to the entrance of the bale chamber.

This White stuffer unit was originally designed for the baling of dry, low density material such as straw or hay, but recently there has been an important shift in some area from the use of hay to the use of silage. Silage grass can also be baled, but since it has a higher moisture content and therefor a higher density than dry crop materials, the load on the components of the stuffer unit increases accordingly. A stuffer overload protection, developed for the baling of straw or hay, will easily be triggered by the forces which occur during the baling of silage. A conventional protection is the use of a shear bolt in the drive line of the stuffer unit. When the loads exceed the shear force of the bolt, the stuffer is disconnected before its components are damaged. This system requires the operator to use valuable time to replace the sheared bolt and is most instances to clear the duct manually before the baler can be restarted.

Some of the forces which occur during the baling of silage can be reduced by applying a low friction layer to the inner surfaces of the duct, as described in U.S. Pat. No. 4,862,797, issued Sep. 5, 1989 in the name of Michel Mathis. This layer diminishes the friction forces of silage in the duct, but it does not cope with the effect of its heavier mass. Thus the larger inertia forces on the tines of the stuffer unit remain unchanged. Hence, the baler still is vulnerable to triggering of the overload protection by normal silage forces.

SUMMARY OF THE INVENTION

It therefore is the objective of the present invention to overcome the aforedescribed problems by modifying the configuration of cranks, arms and fulcrums in such manner that the forces of the crop material on the stuffer tines are reduced substantially, without affecting the proper loading of the crop material from the duct to the bale chamber.

According to one aspect of the present invention an agricultural baler is provided which comprises a bale case, having a wall portion with an entrance opening for the introduction of crop material, compression means disposed for movement in the bale case to compact the crop material into bales, a duct for the transportation of the crop material to entrance opening, loading means operably associated with the duct and comprising a rotatable drive shaft, at least one crank arm fixed to the drive shaft, and a fork assembly comprising tines that move with a predetermined speed along a predetermined path relative to the duct for cyclic engagement of the crop material in the duct and conveyance of charges thereof to the entrance opening. The fork assembly further comprises at least one fork lever which is rotatably coupled with the crank arm on the one hand, and operably supported by guide means, allowing relative movement of said lever to a fulcrum along a predetermined path relative to the lever, on the other hand.

This loading means is characterized in that the fulcrum is movable relative to the drive shaft between a first and a second position.

The guide means preferably comprises a journal which is mounted coaxially with said fulcrum and which fits closely between the longitudinal sides of an oblong slot, provided in the fork lever. The fulcrum is fixed to a pivot member, which is movable by the fork lever or by a cam member of the crank arm. The speed course of the tines can be changed by removing a plug from the fork lever in order to increase the length of the slot and by securing the pivot member relative to the drive shaft.

According to another important aspect of the present invention a method is provided for reducing peak velocities of a loading means of an agricultural baler baler having a bale case with a wall portion with an entrance opening for the introduction of crop material, a duct for the transportation of the crop material to the entrance opening, the loading means being operably associated with the duct and comprising a rotatable drive shaft and at least one crank arm affixed thereto, a fork assembly having tines for cyclic movement along a predetermined first path to cyclically engage the crop material in the duct and convey charges thereof to the entrance opening, and at least one fork lever which is rotatably coupled with the crank arm on the one hand, and operably supported by guide means, allowing relative movement of said lever to a fulcrum along a predetermined second path, relative to said lever, on the other hand.

The method is characterized in that it comprises the steps of maintaining the fulcrum in an original fixed position relative to the drive shaft during a portion of said first path, and moving the fulcrum relative to the drive shaft during another portion of the first path.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
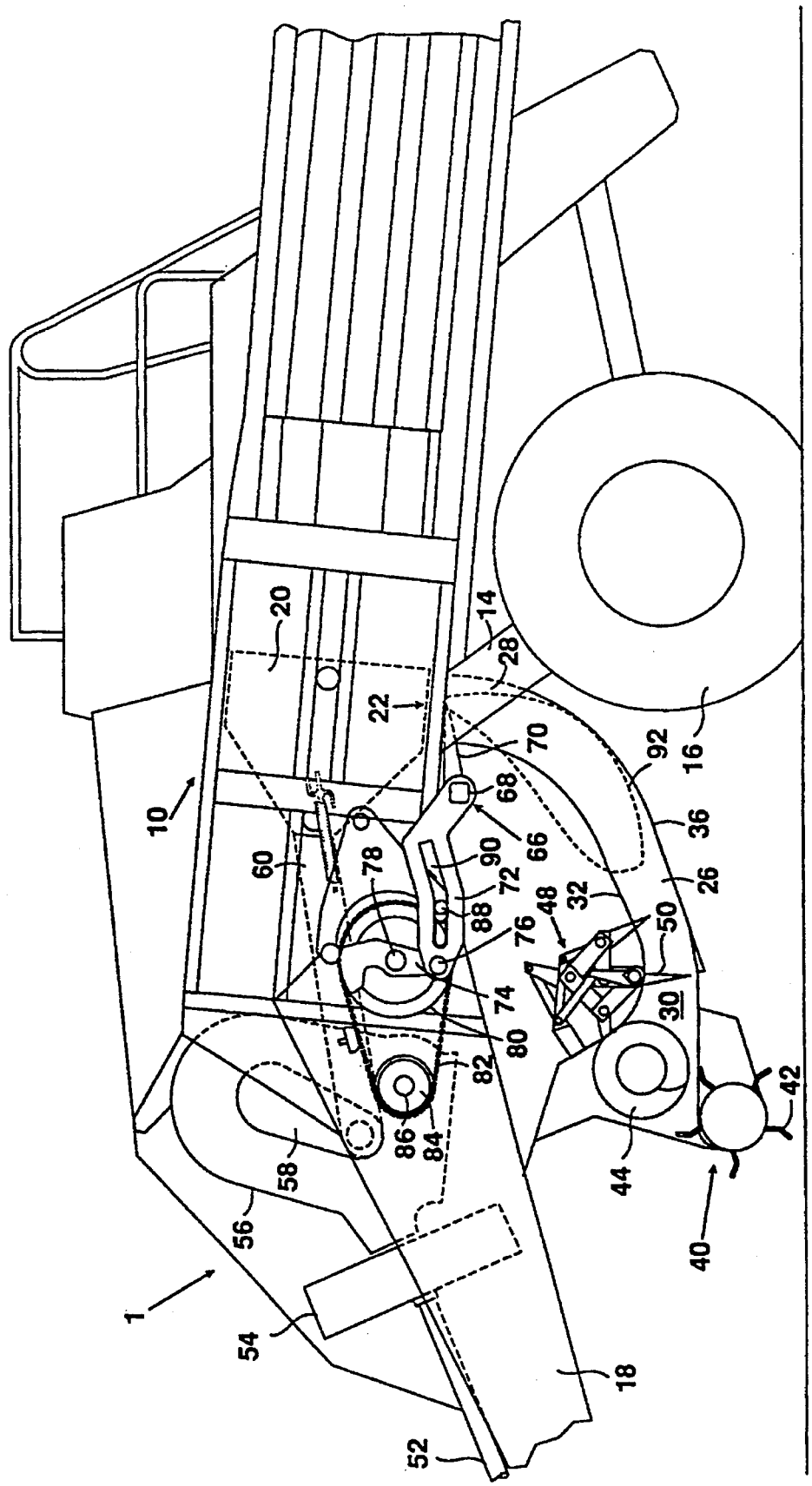
FIG. 1 is a fragmentary, diagrammatic side elevational view of a baler in which the present invention is incorporated.

In FIG. 1 a baler 1 is illustrated having a fore-and-aft extending bale case 10 with a rectangular cross section defining a baling chamber. The bale case 10 is supported in an upwardly and forwardly inclined manner by struts 14 having ground-engaging wheels 16 at their lowermost ends. A downwardly and forwardly projecting tongue 18 at the front of the bale case 10 is adapted for hitching the baler 1 to a towing vehicle (not shown) for advancing the same across a field. An enclosed plunger 20 reciprocates fore-and-aft within the baling chamber for periodically compacting material presented to the chamber through an inlet 22 in the floor 24 of bale case 10 across the full width thereof.

An upwardly curving loading duct 26 depends from the bale case 10 and has its upper discharge end 28 in registration with the inlet 22, while the lower receiving end 30 of the duct 26 is remote from inlet 22 and is disposed substantially forwardly thereof. The duct 26 has a curved top wall 32 which is provided with laterally spaced, longitudinal slots (not shown) extending the full length thereof, and a solid curved bottom wall 36.

The lower end 30 of the duct is positioned directly behind a crop pick-up 40 which may be of any design capable of picking up windrowed or swathed crop material from the field and delivering the same rearwardly into the end 30 of the duct 26. In the illustrated embodiment, the pick-up 40 has a series of lifting tines 42 which sweep the crop upwardly to stub augers 44 which gather the crop centrally and deliver it rearwardly into the lower end 30 of the duct 26.

A packer unit 48 is positioned directly behind the crop pick-up 40 and above the duct end 30 for making a pre-compressed charge of material within the duct 26 preparatory to loading the bale case 10. It contains a plurality of forks with tines 50 which are moved along a generally kidney-shaped path (not shown) to thereby project into the crop material in the lower end 30, push charges thereof rearwardly and upwardly in the duct 26 and retract therefrom while returning to their foremost position.

A power input shaft 52 along the tongue 18 carries a flywheel 54 at the upper end of said tongue 18, immediately adjacent a right angle gearbox 56 coupled with the input shaft 52. The gearbox 56 drives a pair of crank arms 58 which are rotatably linked to a pair of pitman arms 60 of the plunger 20. When rotating power from the towing vehicle is supplied to the input shaft 52, the gearbox 56 rotates the crank arms 58 to thereby reciprocate the plunger 20 within the bale case 10. The same gearbox 56 drives a shaft 86 of a sprocket 84. Other output shafts (not shown) of the gearbox 56 provide either directly or indirectly driving power to the packer unit 48, the pick-up 40 and the stub augers 44.

Behind the packer unit 48 and above the loading duct 26 is mounted a stuffing fork 66 for periodically sweeping an accumulated charge of crop material from the duct 26 into the bale case 10. The fork 66 has a transverse square tube 68 spanning the duct 26 above the latter, to which tube 68 a series of laterally spaced-apart, elongated tines 70 is attached. The tines 70 are spaced apart in accordance with the slots in the top wall 32 of duct 26, such that during the loading cycle the tines 70 may enter the duct 26 through said slots and move along the bottom wall 36 toward the inlet 22 of the bale case 10.

The fork 66 also includes a pair of levers 72 at opposite ends of the tube 68, which levers 72 carry the square tube 68 at their rearmost end and are rotatably coupled at their foremost end with a pair of cranks 74 through pivots 76. The cranks 74 are rigidly affixed to opposite ends of a shaft 78 that spans the bale case 10 above the packer unit 48. The crank 74 on the left side of the baler 1 is also rigidly connected by a shear bolt (not shown) to a large sprocket 80, which receives driving power from an endless chain 82 entrained around the drive sprocket 84, carried by the drive shaft 86. In this manner the foremost or operated end of each lever 72 is mounted for movement in a circular path of travel about the axis of shaft 78.

Figure 2:
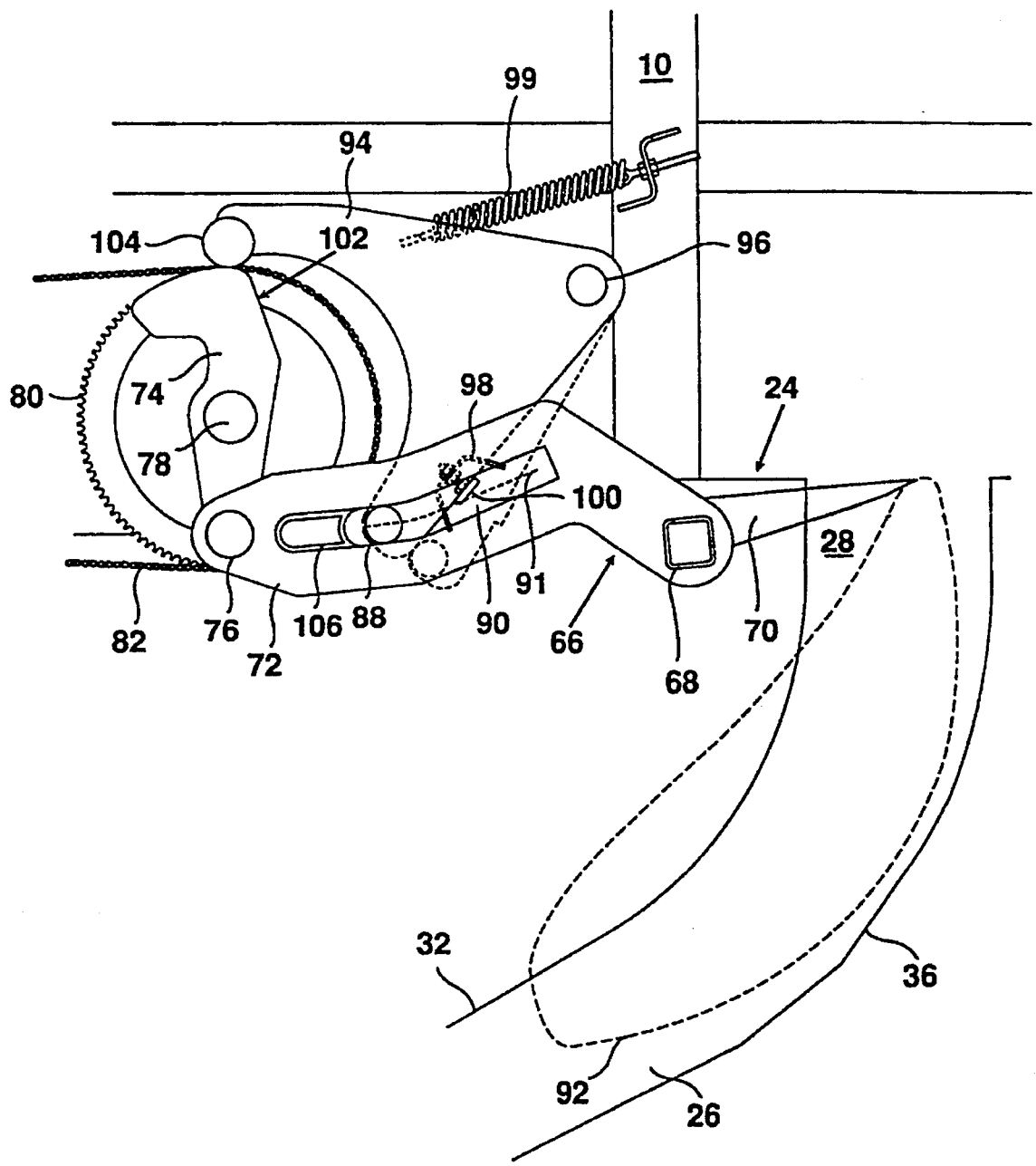
FIG. 2 is an enlarged side view of the loading means of the baler shown in FIG. 1.

As illustrated in FIG. 2, the rearward ends of the levers 72 are operably supported by guide means, comprising a pair of journals 88, which serve as lever fulcrums, and longitudinally extending slots 90 in said pair of levers 72, in which the journals 88 are received. The journals 88 fit closely within the sides of the slots 90 as to make the fulcrums follow a predetermined path 91 (shown in dashed lines in FIG. 2) relative to the levers 72. The journals 88 are rotatably mounted to two generally triangular pivot members 94, which are pivotably attached to the left and right side of the bale case 10 through a pair of pivots 96, positioned behind and slightly above the crank drive shaft 78. The journals 88 and pivot members 94 are forced upwardly by springs 99, of which the one end is attached to the upper half of the members 94 and the other end to the bale case 10. They are held in a first position as shown in full lines in FIG. 2 by a pair of stop bolt assemblies 98, comprising supports, which are affixed to the bale case 10, and stop bolts, interacting with abutments 100 attached to and extending from the lower edge of the pivot members 94. The bolts and nuts of said assemblies 98 are adjustable to modify this first, upmost position of said journals 88.

The front portion of the longitudinally extending slots 90 is filled with plugs 106, the function whereof will be explained further when the operation of the loading means is considered. The plugs are secured to the levers 72 by a rim fitting over said front portion of the slots 90 and by bolt means (not shown).

Opposite to the lever pivots 76 the cranks 74 comprise arms, incorporating cam members 102, which have substantially straight and substantially circular portions, the latter being coaxial with the drive shaft 78. When said cranks 74 are rotated clockwise, first the straight portions of the cam members 102 come into contact with rollers 104, which are rotatably connected to the pivot members 94, and push said members 94 upwardly, whereafter the circular portions keep the rollers 104 and the members 94 in a stationary position, for a purpose which will be explained further on. The bolt assemblies 98 are adjusted to almost engage the abutments 100 during the run of the rollers 104 over the circular portion of the cam members 102.

Figure 3:
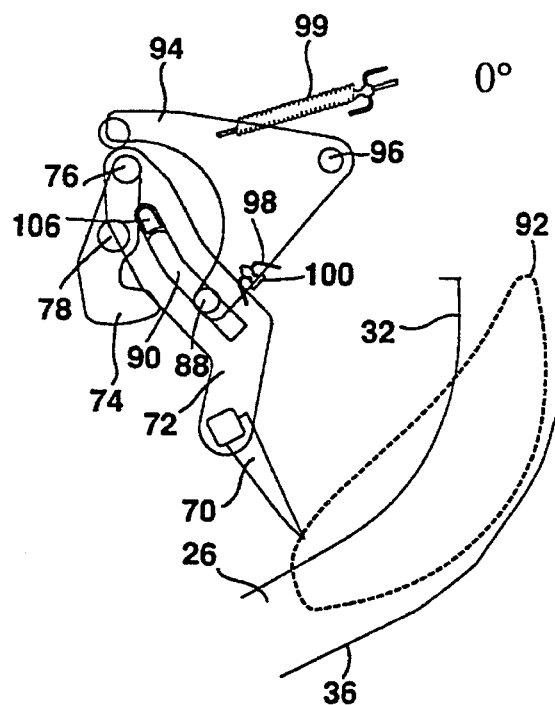
FIGS. 3 to 10 are schematic side views of the loading means, during various stages of operation.

With reference to FIGS. 3 to 10 the operation of the loading means will now be explained in greater detail. FIG. 3 shows the loading means in an initial configuration, in which the tines 70 are arranged outside the duct 26. The cranks 74 are rotated slightly over their upmost position, thereby determining the position of the lever pivots 76. The fork tines 70 are retracted from the duct, so that no significant load is applied to the levers 72 and hence to the journals 88. The springs 99 hold the stop members 100 of the pivot members 94 against the bolt assemblies 98. Thus is determined the location of the journals 88, over which the levers 72 are travelled. Consequently the pivots 76 and the journals 88 univocally position the levers 72 and the tines 70.

Figure 4:
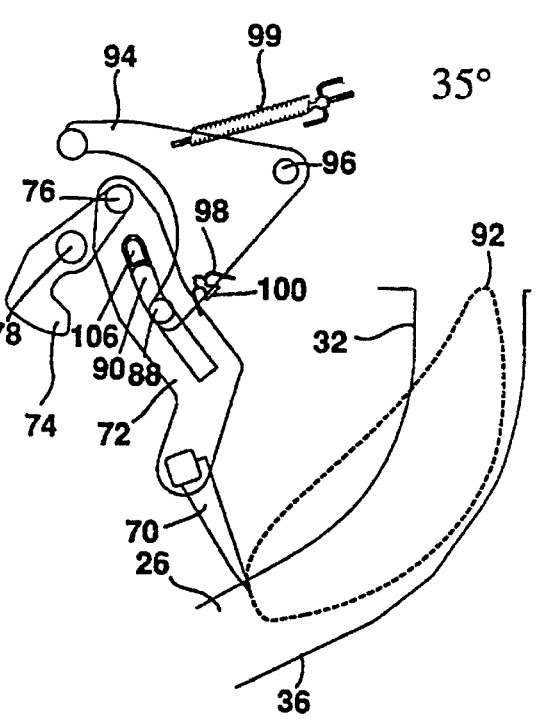

When the cranks 74 are rotated in a clock-wise direction over 35° as illustrated in FIG. 4, the movement of the pivots 76 makes the levers 72 slide over the journals 88 whereby the tines 70 travel forwardly and downwardly along a portion of the path 92 to enter the slots in the top wall 32 of the duct 26. The position of the journals 88 remains unchanged as no significant loads are applied thereto. The distance between pivots 76 and the lever fulcrum as defined by the centre of the journals 88, is decreasing accordingly. As the levers 72 are mainly sliding rectilinearly over the journal 88 without important pivotal movement, the speed of the tines 70 is substantially equal to that of the rotating pivots 76.

Figure 5:
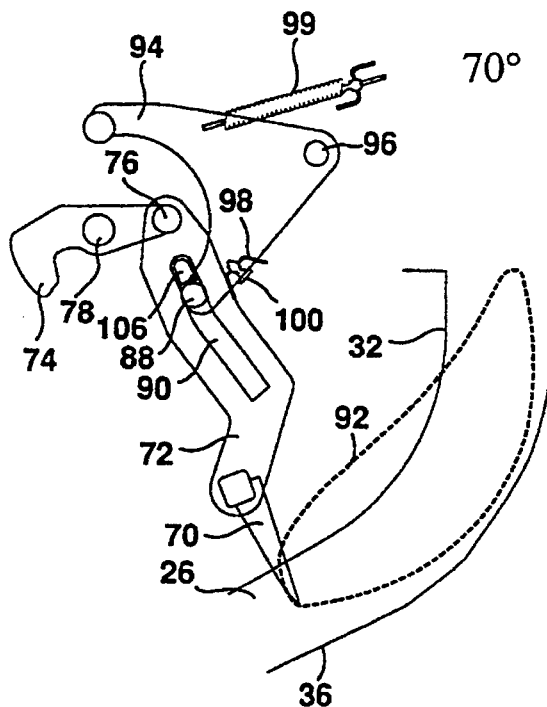

Upon further rotation of the cranks 74 as shown in FIG. 5 the plugs 106 in the slots 90 contact the journals 88 and stop their movement along the predetermined path 91 relative to the levers 72. There is no further decrease of the distance between the pivots 76 and the lever fulcrum. The tines 70 start to move upwardly and rearwardly.

Figure 6:
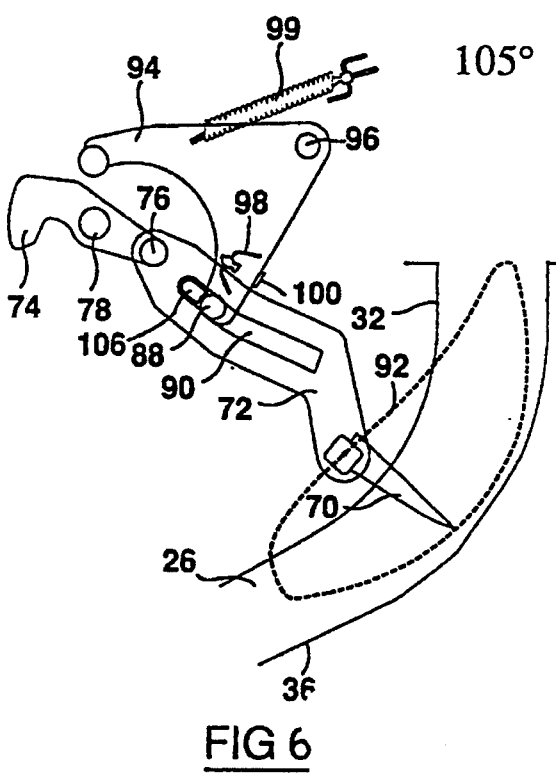

When the cranks 74 are rotated still further, as illustrated in FIG. 6, the journals 88 and the pivot members 94 are pushed down to a second position by the action of the plugs 106 on said journals 88. This second position is also shown in phantom in FIG. 2. The stop members 100 are pivoted away from the stop bolt assemblies 98, which are affixed to the bale case 10, and the spring 99 is stretched accordingly. As the distance between the pivots 76 and the journals 88 still is minimal, a rather short lever arm is present between the pivots 76 and the journals 88 and a longer lever arm between the journals 88 and the top of the tines 70. Consequently the leverage of the fork 66 multiplies the constant speed of rotating pivot 76 at the top of the tines 76. This speed increase relative to the initial speed is clearly shown in FIG. 15, where a dashed graph 110 represents the course of the speed of said tines 76 versus the rotation angle of the crank 74.

Figure 7:
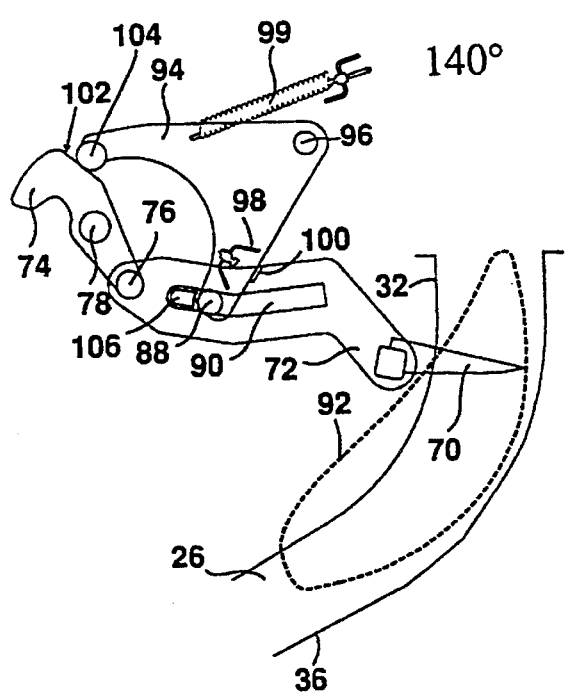

FIG. 7 shows the configuration of the loading means after rotation of the cranks 74 over another 35°. The tines 76 now have swept through more than half of the duct 26, thereby pushing the crop material through the inlet 22 of the bale case 10. The load of the crop material on the tines on the one hand and the action of the pivots 76 on the other hand tend to keep the journals 88 down and stuck to their second position. The pivot members 94 are held down by the forces on the journals 88 since the tension forces of the springs 99 compensate only a portion thereof, thus leaving the members 94 and the journals 88 in their second, lowermost position. If no further measures had been taken, the pivots 76 would pull the tines 70 out of the duct 26 before they had reached the inlet 22 of the bale case 10, thus feeding only an incomplete charge of crop material to the bale case 10. To remedy thereto the substantially straight portions of the cam members 102 have been designed to push the pivot members 94 upwardly during the further rotation of the cranks 74 and the progression of the tines 70 in the duct 26. While the rollers 104 of the members 94 contact said straight portions, the journals 88 remain practically in abutment with the plugs 106 in the slots 90 of the levers 72. As the fulcrum of the levers 72 raises accordingly, the tines 70 are lifted up to the top of the duct 26 to thereby stuff a full charge of crop material into the bale case 10.

Figure 8:
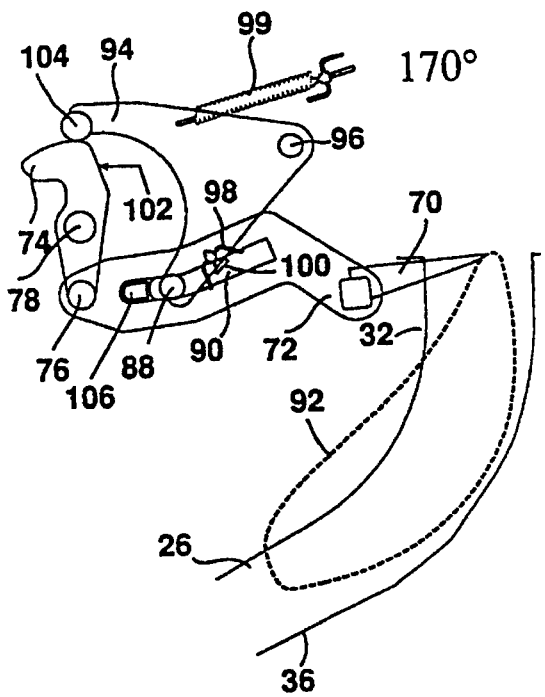

After rotation of the cranks 74 over a further 30° the tines 70 have reached their upmost position, as illustrated in FIG. 8. The pivot members 94 have returned to their first position, in which they are held by the stop bolt assembly 98, in abutment with the stop members 100, and by the circular portions of cam members 102. Consequently, the journals 88 are kept stationary to the bale case 10 and the cranks 74 pull the levers 72 forwardly along the longitudinal slots 90. The plugs 106 at the end of the slots 90 release the journals 88. As the levers 72 momentarily are not pivoted about, but only translated over the journals 88, there is an immediate drop in the speed course of the tines 70 as illustrated by the dashed graph 110 in FIG. 15.

Figure 9:
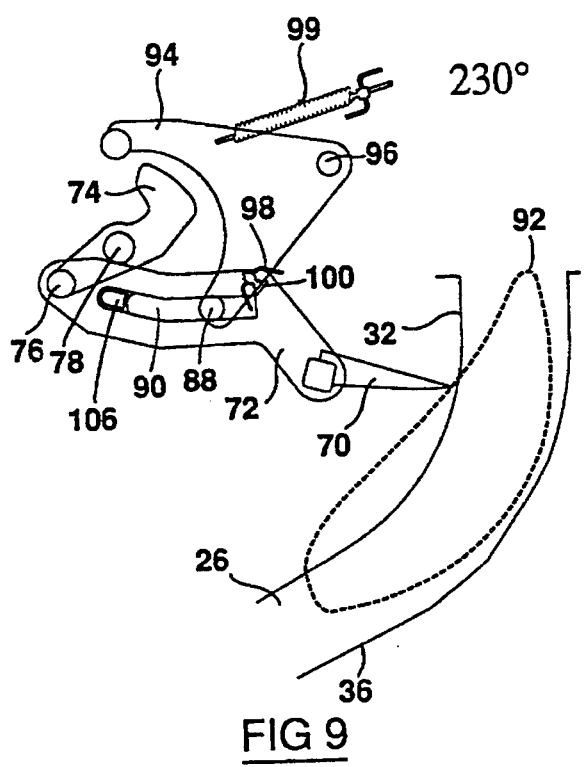
Figure 10:
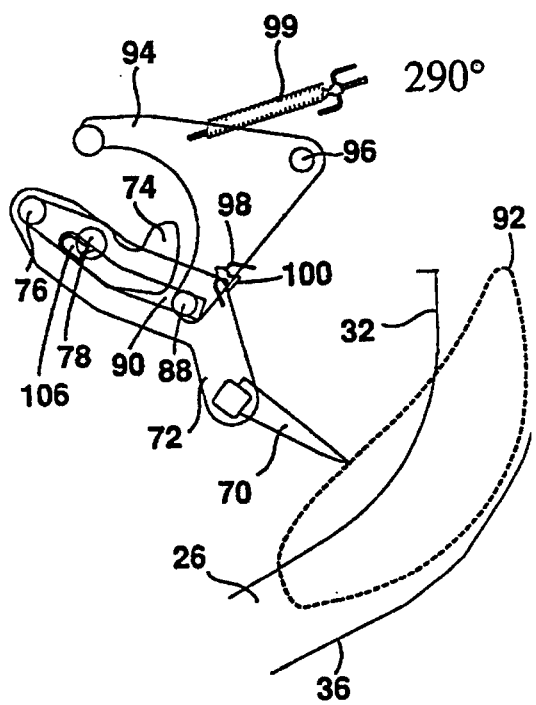

FIGS. 9 and 10 illustrate the further progression of the tines 70 along the path 92 outside the duct 26. The tines 70 are not loaded anymore and the mere action of the springs 99 is capable of keeping the pivot members 94 in their first position. The levers 72 travel over the stationary journals 88, while their pivots 76 are rotated by the cranks 74. The length of the one lever arm defined by the pivots 76 and the journals 88 increases, while the opposite lever arm between the top of the tines 70 and the same journals 88 decreases. Accordingly, the ratio of the speed of the tines 70 to the (constant) speed of the pivots 76 is reduced. This speed decrease is clearly shown in the final portion of the graph 110 of the speed course in FIG. 15.

Figure 15:
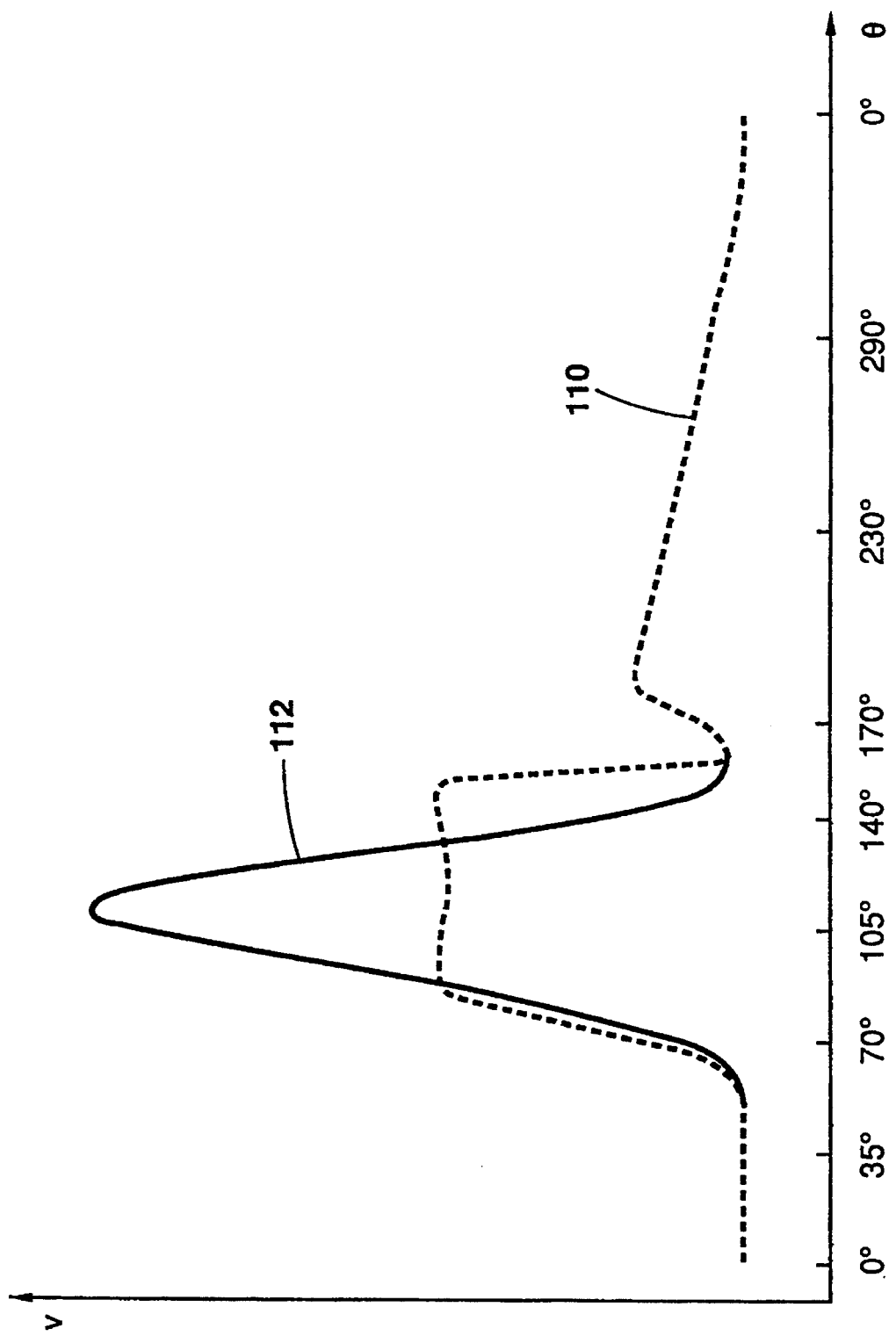
FIG. 15 is a diagram of the speed courses of tines of the initial and modified loading means.

FIGS. 3 to 10, when considered together with FIG. 15, reveal that the tines 70 move slowly along the forward and downward portion of the path 92, when no crop material is fed to the bale case 10, but sweep at a much higher speed through the duct 26, along the rearward and upward portion of the path 92, when a charge of crop material has to be pushed up the bale case 10. The speed course of prior art configurations which is represented by a full-lined graph 112 in FIG. 15, contains a portion wherein the speed of the tines 70 raises quickly to a high level, whereafter it decreases at the same rate, while the speed course of the loading means of the invention stabilizes at a significantly lower level, before returning to the initial low speed. Thus are reduced the maximum forces on the loading means, which are caused by the inertia and friction of the crop material in the duct 26 and which are proportional to the speed of the tines 70.

The maximum speed of the tines 70 is determined by the leverage about the journals 88, in which the minimum distance between the constantly rotated pivots 76 and the journals 88 is crucial. This distance can be modified by replacing the plug 106 by a longer or shorter plug, to thereby limit or extend the path 91 along which the fulcrum can travel relative to the levers 72. A longer plug will stop the journals 88 at a larger distance from the pivots 76 and provide a longer lever arm inbetween. As there remains a shorter lever arm between the journals 88 and the top of the tines 70, these will be pivoted at a slower speed about the journals 88. When a shorter plug is used the opposite effect is obtained and the tines 70 will be pivoted at a higher speed, when compared to the first configuration of the invention. To ensure the proper operation of such adapted loading means, it will be necessary to apply further modifications to the other components thereof such as the location and form of the cam members 102 and of the pivoting members 94. Otherwise the path 92 of the top of the tines 70 will change to the extent that the crop material is not properly loaded to the bale case 10 and interference of the components will prevent the full rotation of the cranks 74.

In some crop conditions the use of a loading means, according to the configuration of U.S. Pat. No. 4,106,267, may prove more effective to obtain even loading of the crop material in bale case 10. The baler of the present invention is easily adaptable to such configuration. The operative length of slots 90 is increased by removing the plugs 106 from the levers 72. It suffices to unscrew the bolt means by which said plugs 106 are secured to the levers 72 and slide them out of the slots 90. The cleared portions of the slots 90 are equally dimensioned to receive the journals 88 therein and to make the fulcrums of the levers 72 follow an extended, predetermined path 91 relative to said levers 72. In this alternative arrangement, the pivot members 94 are secured to the bale case 10 by bolting the stop members 100 to the supports of the stop bolt assemblies 98, whereby the journals 88 get fixed relative to the crank drive shaft 78.

The operation of this modified loading means is illustrated by FIGS. 11 to 14, while the course of the speed of the top of the tines 70 is represented by the full-line graph 112 in FIG. 15.

Initially, there is no change to the movement of the tines 70, when compared to the previous configuration as illustrated in FIGS. 3 and 4: when the cranks 74 rotate from their initial position over 35° the journals 88 still lie in the lower half of the slots 90, do not interfere with the plugs 106 and are kept in a fixed position relative the drive shaft 78. The initial portion of the path 92 of the tines 70 thus remains unvaried. The course of their speed as illustrated in FIG. 15 equally does not change.

Figure 11:
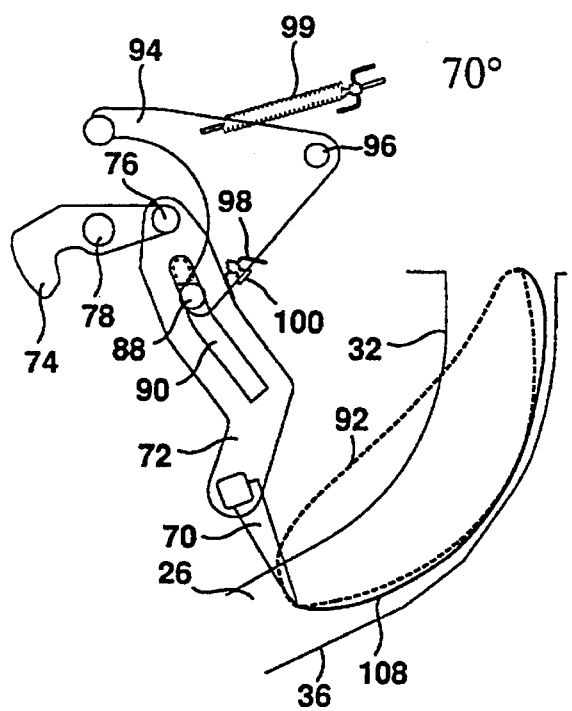
FIGS. 11 to 14 are schematic side views of a modified version of the same loading means, during various stages of operation.

As shown in FIG. 11, the movement of the tines 70 starts to deviate from that of the previous configuration, when the cranks 70 have been rotated over 70°. The journals 88 enter the portions of the slots 90 which were previously blocked by the plugs 106 (now shown in phantom). The pivot members 94 are not forced down anymore and the distance between the pivots 76 and the journals 88 further decreases. The top of the tines 70 is moved rearwardly along a slightly modified path 108 which is represented by a full line in FIGS. 11 to 14.

Figure 12:
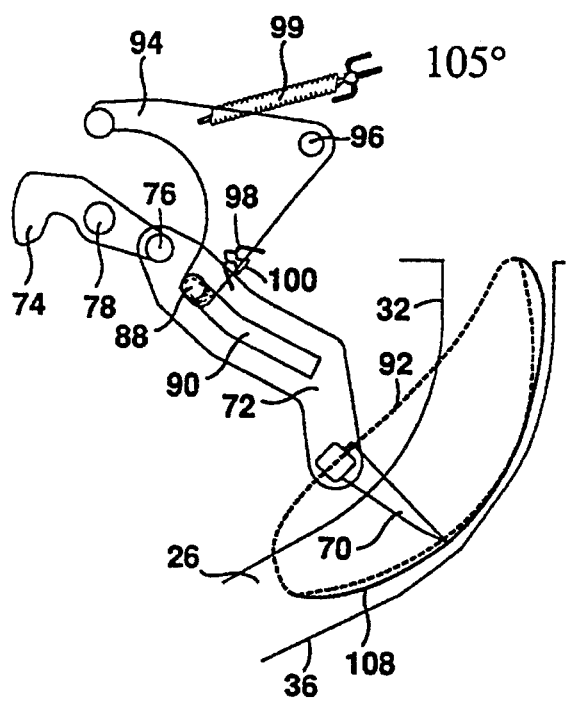

When the cranks 70 are rotated over a further 35° as illustrated in FIG. 12, the distance between the pivots 76 and the journals 88 reaches its minimum. The short lever arm inbetween and the long lever arm between said journals 88 and the top of the tines 70 make the latter sweep the crop material at a high peak speed through the duct 26. This speed increase is clearly shown by the graph 112 in FIG. 15.

Figure 13:
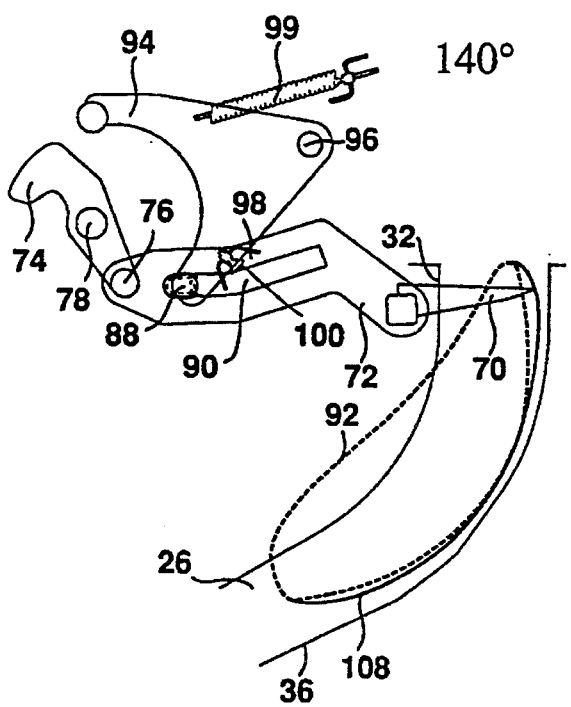

During the further rotation of the cranks 70, as shown in FIG. 13, the pivots 76 move away from the fixed journals 88, thereby increasing the length of the lever arm inbetween. Accordingly the speed of the tines 70 decreases rapidly.

Figure 14:
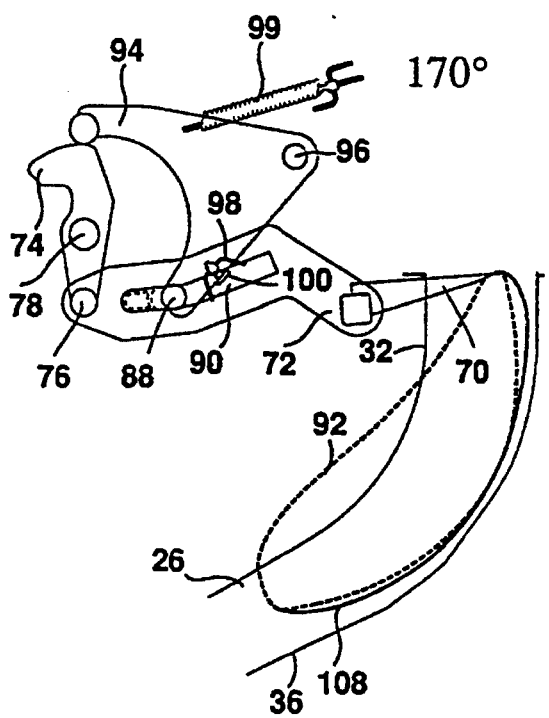

As illustrated in FIG. 14, the tines 70 reach their upmost position when the cranks 74 are rotated over 170°. The journals 88 have left the portions of the slots 90, which were previously occupied by the plugs 106. The location of all components is now fully comparable to their location in FIG. 8: the journals 88 are travelling in the rear portion of slots 90 and the pivot members 94 are held in their upmost position. The tines 70 travel along the upper portion of the path 92 and the speed course also returns to that of the previous configuration, as illustrated in FIG. 15.

During the further rotation of the cranks 74 the modified loading means will resume the positions that were already illustrated in FIGS. 9 and 10. Hence, the removal of the plug 106 and the securing of the pivot member 94 has only influenced a part of the operation of the loading means. The speed course of the top of the tines 70 changes substantially during their rearward and upward movement, but remains the same during the slower forward movement. The changes to the path 92, 108 are limited because of the proper location and dimensioning of the pivot member 94 and its pivot 96.

By reinstalling the plugs 106 and loosening the pivot members 94, the loading means can resume their initial way of operation, whereby the peak speed of the tines 70 is flattened out and the corresponding loads on the loading means diminish.

Other modifications of the loading means can be utilized without departing from the scope of the invention. For example, the path 91, over which the fulcrum can travel relative to the levers 72, may also be shortened by replacing the cylindric journals 88 with oblong supports which fit in the slots 90 of the levers 72. Said supports may be mounted eccentrically relative to the original axis of said replaced journals 88 and may be pivotable about said axis.

The guide means of the lever 72 may be replaced by two rollers between which a rectilinear or curved rail is held, which is affixed to the lever 72. This rail thus constitutes a path which is stationary to lever 72 and along which the fulcrum travels during the rotation of the crank 74. The length of this path can be delimited by abutments which interfere with the rollers on both sides of the rail.

The pivot members 94 also may be loaded for upward movement by other spring means such as gas springs or torsion springs. The position of the pivot members 94 and of the lever fulcrum linked thereto may also be varied by a hydraulic system comprising a hydraulic cylinder, which pivots the members 94 in accordance with the rotational angle of the cranks 74.

While preferred structure and some modifications in which the principles of the present invention have been incorporated are shown, it is to be understood that the invention is not limited to such structure and modifications, but that, in fact, widely different means of varying scope and configuration may be employed in the practice of the invention.

Having thus described the invention, what is claimed is:

1. In an agricultural baler having a bale case comprising a wall portion with an entrance opening for the introduction of crop material, compression means disposed for movement in the bale case to thereby compact said crop material into bales, a duct for the transportation of said crop material to said entrance opening, and loading means, operably associated with said duct and comprising a rotatable drive shaft, at least one crank arm fixed to said drive shaft and a fork assembly, said fork assembly comprising tines moving with a predetermined speed course along a predetermined path relative to said duct for cyclic engagement of said crop material in said duct and conveyance of charges thereof to said entrance opening, and at least one fork lever which is rotatably coupled with said crank arm on the one hand, and operably supported by guide means allowing relative movement of said lever to a fulcrum along a predetermined path relative to said lever, on the other hand, the improvement comprising means for mounting said fulcrum for movement relative to said drive shaft between a first and a second position.

2. An agricultural baler according to claim 1, wherein said guide means comprises a journal, coaxial with said fulcrum and cooperating with an oblong slot provided in said fork lever.

3. An agricultural baler according to claim 2, wherein said journal fits closely between the longitudinal sides of said slot and that upon rotation of said crank, said fulcrum travels to and fro along a single line relative to and within said slot.

4. An agricultural baler according to claim 1 wherein means are provided for determining the position of said fulcrum according to the rotational angle of the crank arm.

5. An agricultural baler according to claim 4, wherein said at least one fork lever forces said fulcrum from the first to the second position.

6. An agricultural baler according to claim 1 wherein said means for mounting said fulcrum comprise a pivotable member to which said fulcrum is fixed.

7. An agricultural baler according to claim 6, wherein stop means are provide to limit the movement of said pivotable member in at least one direction.

8. An agricultural baler according to claim 7, wherein said pivotable member is forced towards said stop means by spring means.

9. An agricultural baler according to claim 1 wherein over a portion of the path of the tines, the position of said fulcrum is changed by said crank arm.

10. An agricultural baler according to claim 9, wherein said crank arm forces said fulcrum from the second to the first position.

11. An agricultural baler according to claim 10, wherein the position of said fulcrum is changed by a cam member affixed to said crank arm.

12. An agricultural baler according to claim 1, wherein said loading means are provided with convert means for changing at least a portion of the said predetermined speed course to an alternative speed course.

13. An agricultural baler according to claim 12, wherein said convert means comprise means for changing the guide means of said fork lever in order to modify the predetermined path along which the fulcrum moves relative to said fork lever.

14. An agricultural baler according to claim 13, wherein said convert means change the length of said path.

15. An agricultural baler according to claim 13, wherein said convert means comprise means for fixing said fulcrum relative to the drive shaft.

16. A method for reducing peak velocities of a loading means of an agricultural baler, said baler having, a bale case with a wall portion with an entrance opening for the introduction of crop material, and a duct for the transportation of said crop material to said entrance opening, said loading means being operably associated with said duct and comprising, a rotatable drive shaft and at least one crank arm affixed thereto, a fork assembly having tines for cyclic movement along a predetermined first path to cyclically engage said crop material in said duct and convey charges thereof to said entrance opening, and at least one fork lever which is rotatably coupled with said crank arm on the one hand, and operably supported by guide means allowing relative movement of said lever to a fulcrum along a predetermined second path relative to said lever, on the other hand, said method being characterized in that it comprises the steps of, maintaining the fulcrum in an original, fixed position relative to said drive shaft during a portion of said first path, and moving said fulcrum relative to said drive shaft during another portion of said first path.

17. A method according to claim 16, wherein said guide means comprises a journal coaxial with said fulcrum, said journal cooperating with an oblong slot in said fork lever, and wherein said journal is affixed to a pivotable member, said method being further characterized in that the moving step includes, engaging one of the ends of said oblong slot with said journal, whereby the member is pivoted and the fulcrum leaves its original position.

18. A method according to claim 17, wherein said crank arm comprises a cam member and wherein a roller is attached to said pivotable member, said method being further characterized in that the moving step further includes, engaging said cam member with the roller, whereby the member is pivoted back and the fulcrum returns to its original position.

* * * * *